United States Patent [19]
Joesting

[11] 3,783,892
[45] Jan. 8, 1974

[54] LONG TIMING, SLOW FLOW DEVICE

[75] Inventor: Frederick D. Joesting, Park Ridge, Ill.

[73] Assignee: Honeywell Inc., Minneapolis, Minn.

[22] Filed: Oct. 3, 1972

[21] Appl. No.: 294,737

[52] U.S. Cl. .............................. 137/493, 137/501
[51] Int. Cl. ............................................. G05d 7/01
[58] Field of Search................... 137/501, 495, 497, 137/505.18, 505.13, 493, 493.8

[56] References Cited
UNITED STATES PATENTS
2,192,042  2/1940  Hoffmann........................... 137/501
2,807,144  9/1957  St. Clair........................... 137/501 X
3,602,252  8/1971  Barnes............................. 137/501 X Primary Examiner—Henry T. Klinksiek
Assistant Examiner—Robert J. Miller
Attorney—Lamont B. Koontz et al.

[57] ABSTRACT

A long timing fluidic device comprises a conventional restriction in a supply conduit, a diaphragm module having a flow chamber in communication with the supply conduit, a valving chamber connected to an output conduit, a control chamber in communication with a third conduit the other end of which is connected to the supply conduit upstream of said restriction, and a diaphragm or pressure reactor, whereby the module insures that the pressure drop across the restriction is of a low value.

14 Claims, 5 Drawing Figures

PATENTED JAN 8 1974 3,783,892

PATENTED JAN 8 1974

LONG TIMING, SLOW FLOW DEVICE

BACKGROUND OF THE INVENTION

This invention relates to a pneumatic diaphragm device for producing an air flow having a long time constant. Devices are known for providing a timing function in pneumatic control circuits. Some of these devices include restrictions, volumes and porous membranes. Such devices either have a time constant which is too short for application in many control systems, costly or are so constructed that the reproducability of resulting time constants is not at all reliable.

The devices which are the subject of this invention are designed to eliminate the disadvantages of the prior art devices.

SUMMARY OF THE INVENTION

The principle of the slow flow concept disclosed herein is to regulate the pressure drop across an ordinary restriction to a relatively small value thereby causing a slow change in output pressure. The restriction is provided in a main conduit connected to the supply source. A diaphragm module is provided which has a flow chamber connected to the main conduit downstream of the restriction and a control chamber connected upstream of the restriction. An outlet conduit is connected to a valving chamber or nozzle. A spring either fixed or adjustable, may be provided to properly bias the diaphragm of the module. The diaphragm may also be biased by varying the area of the diaphragm facing the upstream portion of the main conduit upstream of the restriction with respect to the area of the diaphragm facing the portion of the main conduit downstream of the restriction. Therefore, by properly choosing the spring force and/or the diaphragm surface areas, a low pressure differential can be provided across the restriction to thereby yield a slow change in output pressure and as a result, a long time constant.

These devices are substantially linear. However, by properly providing a feedback between the outlet conduit and the module, the output response from the device approximates a logarithmic function.

According to other features of the invention, the linear slow flow modules can be placed in series to provide a reversible device, i.e., the inputs and outputs can be reversed.

According to still another feature of the invention, a reversible logarithmic slow flow device can be made by placing two logarithmic slow flow devices substantially in parallel.

These and other features of the invention will become apparent from a consideration of the detailed description and appended drawings.

DETAILED DESCRIPTION OF THE INVENTION

Figure 1:
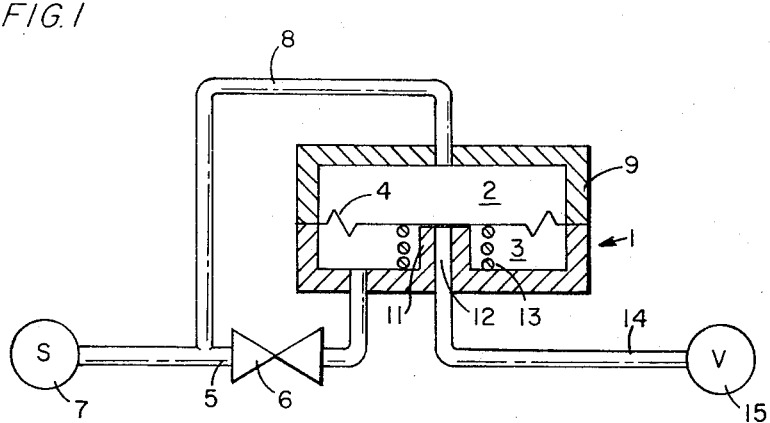
FIG. 1 is a schematic illustration of one form of the linear slow flow device.

The first form of the simple slow flow device is shown in FIG. 1 and comprises a diaphragm module generally shown at 1 having a housing 9 divided into a control chamber 2 and a flow chamber 3 by a pressure reactor or diaphragm 4. A first conduit 5, having a restriction 6 therein, is adapted to connect a source of pressure 7 to the flow chamber 3 of the diaphragm module 1. The control chamber 2 is connected to the first conduit 5, upstream of the restrictor 6, by a second conduit 8.

The diaphragm module also contains a partition or nozzle 11 forming a valving means or chamber 12 therein. Encircling the partition 11 is a biasing means or spring 13 for biasing the diaphragm 4 away from the valving chamber 12. The valving chamber 12 is connected to a volume or output means 15 by a third conduit 14.

It is apparent that the spring force can be readily adjusted by providing a manual adjustment (not shown) in the diaphragm module.

The time constant of a conventional restriction, such as restriction 6 in FIG. 1, is very short. By decreasing the pressure drop across the conventional restriction 6, the flow through the restriction can be decreased and, therefore, the time constant can be increased.

After pressure has been supplied to the diaphragm module 1, the forces acting upon diaphragm 4 can be shown by the expression $$P1\ A1 = P2\ A2 + S$$

where $P1$ is the pressure in conduit 5 upstream of the restrictor 6, $P2$ is the pressure in conduit 5 downstream of the restriction 6, $A1$ is the area of the surface of diaphragm 4 which faces the control chamber 2, $A2$ is the surface of the diaphragm 4 which faces the flow chamber 3 and $S$ is the spring force. For the purposes of showing the pressure drop across restriction 6, it can be assumed that the force exerted on diaphragm 4 by the pressure in conduit 14 is negligible. Since $A1$ is very nearly equal to $A2$, assuming that the area of the diaphragm over the nozzle 12 is negligible, the equation can be reduced to $$P1 - P2 = S/A2$$

And, thus, it can be seen that by properly choosing the spring force and diaphragm area, the pressure drop across the restriction 6 can be chosen small enough that the pressure change through the restriction is slow and, therefore, a long time constant is obtained.

Figure 2:
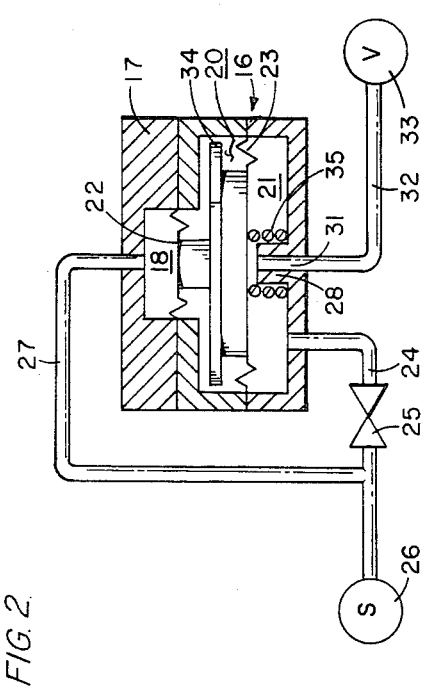
FIG. 2 is a schematic illustration of a second form of the slow flow device.

FIG. 2 discloses a similar type of linear slow flow device which generally comprises a diaphragm module 16 having a housing 17 divided into a control chamber 18, a middle chamber 20 and a flow chamber 21. A diaphragm 22 separates the control chamber 18 from the middle chamber 20 and a diaphragm 23 separates the middle chamber 20 from the flow chamber 21. A first conduit 24 having a restriction 25 therein is adapted to connect a source of fluid 26 to the flow chamber 21. The control chamber 18 is connected to the upstream side of the restriction 25 by a second conduit 27.

The housing 17 forms a partition or nozzle 28 having a valving chamber 31 therein. A third conduit 32 connects the valving chamber 31 to an outlet means or volume 33. Within the middle chamber 20 of the housing 17 is a pressure plate 34 separating the diaphragm or pressure reactor 22 from the diaphragm or pressure reactor 23.

As in the device of FIG. 1, the principle upon which the device of FIG. 2 operates is to establish across the restriction 25 a small pressure difference. The forces acting upon the assembly comprising diaphragm 22, diaphragm 23, and pressure plate 34 can be expressed by the equation $$P1\ A1 = P2\ A2 + S$$

wherein $P1$ is the pressure of the supply source, $A1$ is the area of the surface of diaphragm 22, $P2$ is the pressure in first conduit 24 downstream of the restriction 25, $A2$ is the area of the surface of diaphragm 23 and $S$ is the spring force asserted on the assembly by the spring 35 encircling the nozzle or partition 28. Again, this equation neglects the area of the surface of diaphragm 23 immediately over the valving chamber 31. As in the module of FIG. 1, by properly choosing $A1$, $A2$ and $S$, a long time constant can be obtained. It can also be noted from this equation that, since $A1$ is unequal to $A2$, the spring 35 can, in most instances, be eliminated from the diaphragm. Thus, with spring 35 eliminated, the biasing means, comprising diaphragms 22 and 23, depends solely upon the difference in their surface areas $A1$ and $A2$.

Figure 3:
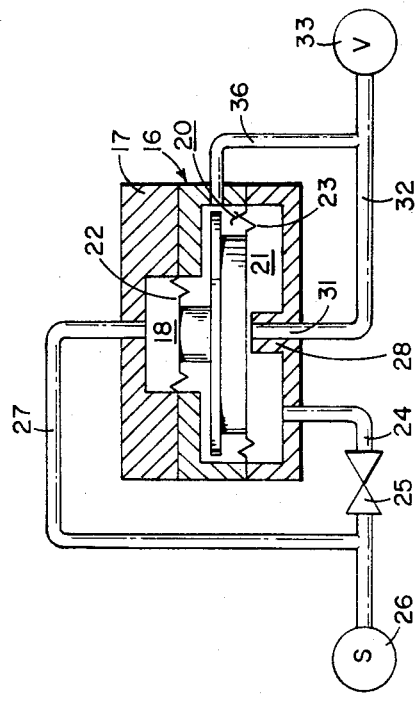
FIG. 3 is a schematic illustration of the logarithmic slow flow device.

A substantially logarithmic device can be provided by a modification of the device shown in FIG. 2. Referring to FIG. 3, the device shown therein is substantially similar to the one shown in FIG. 2 and therefore, the same reference numerals are used when applicable. A feedback circuit is provided by a conduit 36 connected from the outlet or third conduit 32 back to the middle chamber 20. The forces exerted on the assembly comprising diaphragms 22 and 23 and pressure plate 34 can now be shown as $$P1\ A1 + P3\ A2 = P3\ A1 + P2\ A2$$

or $$P2 = P1\ (A1/A2) + P3\ [(A2-A1)/A2]$$

wherein $P1$ is the pressure of source 26, $P2$ is the pressure in first conduit 24 downstream of restriction 25, $P3$ is the pressure in third conduit 32, $A1$ is the area of the surface of disphragm 22, and $A2$ is the area of the surface of diaphragm 23. Again, the area of the surface of diaphragm 23 immediately over the valving chamber has been neglected for purposes of simplification.

Since the areas $A1$ and $A2$ are constant and by assigning $P1$, $A2$ and $A1$ values, it can be shown that the pressure in the second conduit 24 downstream of restriction 25 will change as the pressure in third conduit 32 changes. Since the pressure of the supply source in this example is constant, a changing pressure in the first conduit 24 downstream of the restriction 25 means that the pressure drop across the restriction 25 will change. This change approximates a logarithmic function.

Figure 4:
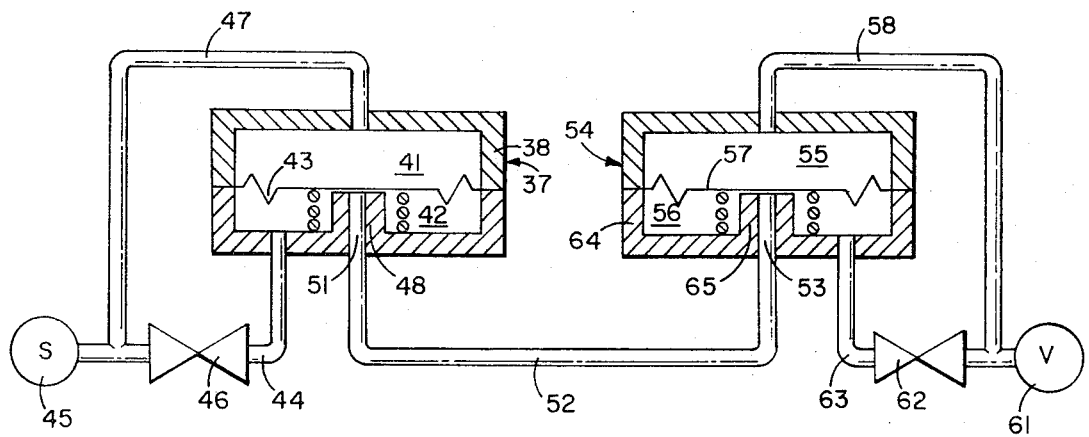
FIG. 4 is a schematic illustration of the reversible linear slow flow device.

The slow flow modules described so far limit flow in one direction; in the other direction, the flow will be determined by the full pressure drop across the restriction, which is not low. FIG. 4 discloses a circuit arrangement which can be used as a bidirectional linear slow flow device. In FIG. 4, module 37 comprises a housing 38 having a control chamber 41 and a flow chamber 42 divided by a pressure reactor or diaphragm 43. A first conduit 44, having a restriction 46 therein, is adapted to connect a source 45 of fluid to the flow control chamber. The control chamber 41 is connected to the conduit 44 upstream of the restriction 46 by a conduit 47. The housing 38 also contains a partition 48 having a valving means 51 formed therein. A conduit 52 connects the valving chamber 51 of module 37 to the valving chamber 53 of diaphragm module 54. Module 54 has a control chamber 55 and a flow chamber 56 divided by a diaphragm 57. The control chamber 55 is connected by a conduit 58 to an output means or volume 61. Volume 61 is also connected through a restriction 62 by a conduit 63 to the flow chamber 56. The housing 64 of module 54 also forms a partition or nozzel 65. As can be seen from the circuit disclosed in FIG. 4, if pressure is applied to source 45 and volume 61 is designated the output means, the diaphragm module 37 controls the pressure drop across restriction 46 whereas the assembly comprising module 54 acts as a mere restriction, the restriction being that of restriction 62. If the input and output means 45 and 61 are reversed, then the diaphragm module 54 controls the pressure drop across 62 whereas the pressure drop across 46 is that of an ordinary restriction and is allowed to vary.

Figure 5:
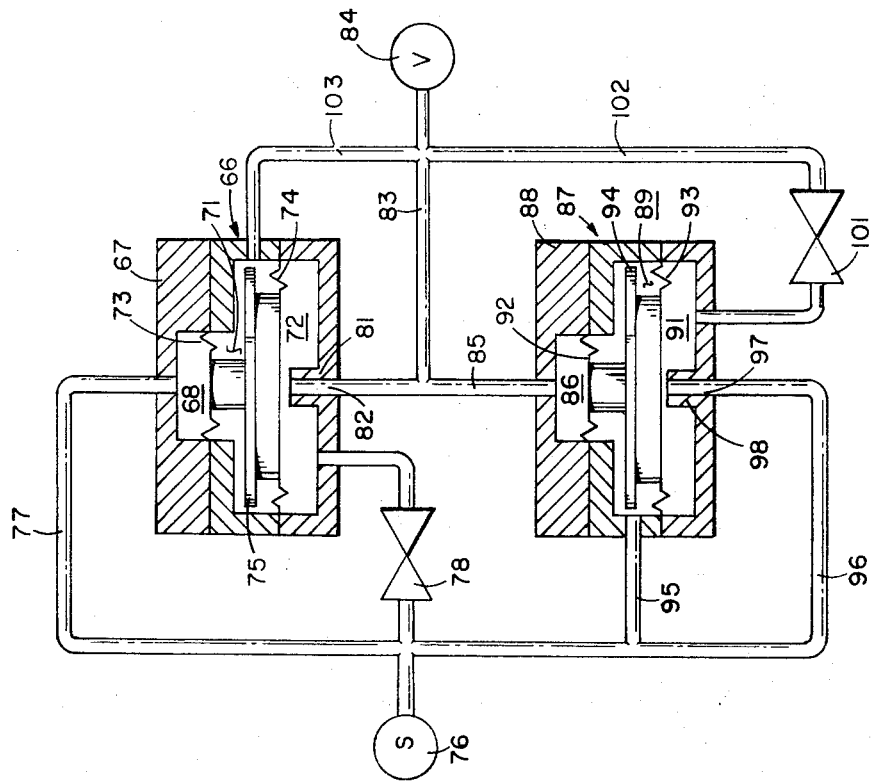
FIG. 5 is a schematic illustration of the reversible logarithmic slow flow device.

FIG. 5 shows a bidirectional logarithmic slow flow device. Module 66 comprises a housing 67 having a control chamber 68, a middle chamber 71 and a flow chamber 72. The control chamber 68 is separated from the middle chamber 71 by a diaphragm 73 whereas the middle chamber of 71 is separated from the flow chamber 72 by a diaphragm 74. Diaphragm 73 is separated from diaphragm 74 by a pressure plate 75. Control chamber 68 is adapted to be connected to a source of pressure 76 by way of a conduit 77 whereas the flow chamber 72 is adapted to be connected to the source 76 through a restriction 78. The housing 67 forms a partition or nozzel 81 having a valving chamber 82 formed therein. The valving chamber 82 is connected by way of a conduit 83 to an output means or volume 84. Valving chamber 82 is also connected by way of conduit 85 to the control chamber 86 of a diaphragm module 87 having a housing 88. The diaphragm module 87 is divided into a control chamber 86, a middle chamber 89, and a flow chamber 91. The control chamber 86 is separated from the middle chamber 89 by a diaphragm 92 whereas the middle chamber 89 is separated from the flow chamber 91 by a diaphragm 93. A pressure plate 94 is included to separate the diaphragm 92 from the diaphragm 93.

The middle chamber 94 is adapted to be connected by way of a conduit 95 to the supply 76. The supply 76 is also adapted to be connected by way of a conduit 96 to the valving chamber 97 formed in partition 98. Flow chamber 91 is connected through a restriction 101 and by way of a conduit 102 to the volume 84. Finally, volume 84 is connected to middle chamber 71 of module 66 by way of conduit 103. As can be seen from a study of the circuit disclosed in FIG. 5, input pressure may be applied to either terminal 76 or terminal 84 and the resulting output will be substantially a logarithmic function.

While various references have been made herein to specific uses of the subject slow flow modules, it is intended that the scope of the invention be limited only to the scope of the appended claims.

The embodiments of the invention in which an exclusive property or right is claimed are defined as follows:

1. A fluid pressure responsive device regulating the pressure drop across a fluid flow restriction comprising:
first valve means including;
first housing means,
first pressure reactor means dividing the housing means into a flow chamber and a control chamber,
first partition means disposed within the flow chamber and arranged to cooperate with the pressure reactor means to further define a valving chamber,
outlet means;
first conduit means including a fluid restriction connected to the flow chamber, said first conduit means adapted to be connected to a source of fluid pressure;
second conduit means interconnecting said control chamber to said first conduit means upstream of said fluid restriction;
third conduit means interconnecting said valving chamber to said outlet means; and,
biasing means arranged in such a manner as to tend to maintain said valve means open.

2. The fluid pressure responsive device as defined in claim 1 wherein said biasing means comprises a spring means.

3. The fluid pressure responsive device as defined in claim 1 wherein said pressure reactor means comprises a diaphragm.

4. The fluid pressure responsive device as defined in claim 3 wherein said diaphragm means comprises a first diaphragm having a first surface area facing said control chamber, a second diaphragm having a second surface area facing said flow chamber and wherein said first and second diaphragms define a middle chamber in said housing means.

5. The fluid pressure responsive device defined in claim 4 further comprising feedback means connected from said third conduit means to said middle chamber of said housing means.

6. The fluid pressure responsive device as defined in claim 5 further comprising:
second valve means including;
second housing means
second pressure reactor means including first and second diaphragms dividing said housing into a flow chamber, a middle chamber, and a control chamber, wherein said first diaphragm separates said control chamber from said middle chamber and said second diaphragm separates said middle chamber from said flow chamber,
second partition means disposed within said flow chamber and arranged to cooperate with said pressure reactor means to further define a second valving chamber;
fourth conduit means connecting said first conduit means upstream of said restriction to said middle chamber of said second housing means;
fifth conduit means connecting said fourth conduit means to said second valving chamber;
sixth conduit means including a second restriction connecting said flow chamber of said second housing to said third conduit means; and,
seventh conduit means connecting said third conduit means to said control chamber of said second housing,
wherein said device is a bidirectional, substantially logarithmic fluid flow restriction device.

7. The fluid pressure responsive device as defined in claim 6 wherein the said first pressure reactor means further comprises a pressure plate for separating said first diaphragm from said second diaphragm, said second pressure reactor means comprises a second pressure plate for separating said first diaphragm from said second diaphragm of said second housing means, said first partition means comprises a nozzle means and said second partition means comprises a nozzle means.

8. The fluid pressure responsive device of claim 4 wherein said diaphragm means further comprises a pressure plate for separating said first diaphragm from said second diaphragm.

9. The fluid pressure responsive device of claim 8 wherein said biasing means comprises the said first diaphragm and said second diaphragm wherein the surface areas of said first and second diaphragms are unequal.

10. The fluid pressure responsive device of claim 9 wherein said partition means comprises a nozzle means.

11. The fluid pressure responsive device of claim 10 wherein said biasing means further comprises a spring means for biasing said diaphragm means away from said nozzle means.

12. The fluid pressure responsive device as defined in claim 1 wherein said outlet means comprises:
second valve means including
second housing means,
second pressure reactor means dividing said second housing means into a flow chamber and a control chamber,
second partition means disposed within said flow chamber and arranged to cooperate with said second pressure reactor means to further define a second valving chamber;
fourth conduit means connecting said third conduit means to said second valving chamber;
fifth conduit means including a second restriction connected to said flow chamber of said second housing and adapted to be connected to said load means; and,
sixth conduit means connecting said control chamber of said second housing means to said fifth conduit means between said load means and said second restriction,
wherein said device is a linear bidirectional fluid pressure responsive device.

13. The fluid pressure responsive device as defined in claim 12 wherein said first and second pressure reactor means comprises first and second diaphragms respectively, and said first and second partition means comprises first and second nozzel means respectively.

14. A fluid pressure responsive device regulating the pressure drop across the fluid flow restriction comprising:
inlet means adapted to be connected to a source of fluid pressure;
a fluid flow restriction;
nozzle means;
outlet means;
means including conduit means serially interconnecting the inlet means, fluid flow restriction means, nozzle means and outlet means;
means including pressure reactor means for variably controlling the flow of fluid through said nozzle means, the pressure reactor means being responsive to fluid pressure upstream of said fluid flow restriction to decrease the flow of fluid through said nozzle means and responsive to fluid pressure downstream of the fluid flow restriction to increase the flow of fluid through the nozzle means; and, biasing means arranged in such a fashion that it tends to bias said partition means away from said nozzle means.

* * * * *